（12）United States Patent
Nakamura et al.

(10) Patent No.: US 9,568,358 B2
(45) Date of Patent: Feb. 14, 2017

(54) OPTICAL MEASUREMENT DEVICE AND VEHICLE

(71) Applicants: Tadashi Nakamura, Tokyo (JP); Shigeaki Imai, Kanagawa (JP)

(72) Inventors: Tadashi Nakamura, Tokyo (JP); Shigeaki Imai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 661 days.

(21) Appl. No.: 13/956,748

(22) Filed: Aug. 1, 2013

(65) Prior Publication Data

US 2014/0036071 A1  Feb. 6, 2014

(30) Foreign Application Priority Data

Aug. 6, 2012 (JP) ................... 2012-174182
Jul. 1, 2013 (JP) ................... 2013-138306

(51) Int. Cl.
 *G01J 1/04* (2006.01)
 *G01C 3/08* (2006.01)
 (Continued)

(52) U.S. Cl.
 CPC ............. *G01J 1/0422* (2013.01); *G01C 3/08* (2013.01); *G01S 7/4811* (2013.01); *G01S 7/4815* (2013.01);
 (Continued)

(58) Field of Classification Search
 CPC ........ G01C 3/08; G01J 1/0422; G01B 11/002; G01B 11/24; G02B 26/12; G02B 27/0031; G02B 26/101
 (Continued)

(56) References Cited

U.S. PATENT DOCUMENTS 5,668,631 A * 9/1997 Norita ................. G06T 7/0057
                                                    250/559.22
5,864,391 A  1/1999 Hosokawa et al.
(Continued)

FOREIGN PATENT DOCUMENTS

EP  1 515 157 A1  3/2005
JP  11-304469  11/1999
JP  3446466  9/2003

OTHER PUBLICATIONS

U.S. Appl. No. 13/909,340, filed Jun. 4, 2013.
(Continued)

*Primary Examiner* — Sath V Perungavoor
*Assistant Examiner* — Nathnael Aynalem
(74) *Attorney, Agent, or Firm* — Oblon, McClelland, Maier & Neustadt, L.L.P.

(57) ABSTRACT

Disclosed is an optical measurement device including a first light source, an optical element that condenses a light beam emitted from the first light source, a light irradiator that irradiates the light beam onto an object; and a photo detector that detects reflected light or scattered light of the light beam from the object through an imaging system, the light beam being irradiated onto the object, wherein a first optical path length from the first light source to a first conjugate image of the first light source by the optical element is different from a second optical path length from the photo detector to a second conjugate image of the photo detector by the imaging system at least in a first direction.

8 Claims, 12 Drawing Sheets

(51) Int. Cl.
*G01S 17/93* (2006.01)
*G01S 7/481* (2006.01)
*G01S 17/42* (2006.01)

(52) U.S. Cl.
CPC .............. *G01S 7/4817* (2013.01); *G01S 17/42* (2013.01); *G01S 17/936* (2013.01)

(58) Field of Classification Search
USPC ........................................................ 348/135
See application file for complete search history.

(56) References Cited

U.S. PATENT DOCUMENTS

| | | | |
|---|---|---|---|
| 6,301,003 | B1 | 10/2001 | Shirai et al. |
| 2002/0143506 | A1 | 10/2002 | D'Aligny et al. |
| 2004/0004723 | A1* | 1/2004 | Seko ........................ G01B 9/02 356/498 |
| 2004/0004748 | A1* | 1/2004 | Kawabata .......... G02B 27/0031 359/216.1 |
| 2007/0181810 | A1 | 8/2007 | Tan et al. |
| 2008/0007711 | A1* | 1/2008 | Liu ........................... G01C 3/08 356/5.11 |
| 2011/0013200 | A1* | 1/2011 | Kato ..................... G01B 11/002 356/625 |
| 2013/0077083 | A1 | 3/2013 | Suzuki et al. |
| 2013/0120734 | A1 | 5/2013 | Ogata et al. |

OTHER PUBLICATIONS

Extended European Search Report issued Dec. 1, 2014 in Patent Application No. 13178647.7.
U.S. Appl. No. 13/771,465, filed Feb. 20, 2013.
U.S. Appl. No. 13/930,030, filed Jun. 28, 2013.
U.S. Appl. No. 13/920,421, filed Jun. 18, 2013.

* cited by examiner

OPTICAL MEASUREMENT DEVICE AND VEHICLE

BACKGROUND OF THE INVENTION

1. Field of the Invention

The present invention relates to an optical measurement device and a vehicle to which the optical measurement device is mounted. The optical measurement device detects the presence or absence of an object, and measures a distance from the optical measurement device to the object. The optical measurement device can be used for factory automation (FA), for security, or for automotive usage.

2. Description of the Related Art

An optical measurement device has been known which detects the presence or absence of an object, and which measures a distance to the object. As an example of the optical measurement device, the following device may be considered. Namely, the device scans a predetermined measurement field with a light beam by deflecting the light beam by a rotating polygonal mirror. The device receives the light, which is reflected by a measured object in the measurement field, with a photo detector by continuously changing a viewing angle by using the same rotating polygonal mirror, and thereby the device measures a distance to the scanning point (e.g., Patent Document 1 (Japanese Unexamined Patent Publication No. H11-304469)).

In the above-described device, a light beam from a semiconductor laser as a light source is converted into parallel light by an optical element (a transmitter lens). It is also described that a light beam is narrowed down onto a position sensitive device (PSD), which is a photo detector, by using an imaging means (a receiver lens). Although it is not explicitly described, it implies that the PSD is disposed at a position of a focal length of the receiver lens.

Namely, in these cases, a distance between an object point (the light source or the photo detector) and a lens (the transmitter lens or the receiver lens) is set to be the focal length of the lens. This setting implies that a conjugate image of the object point can be formed at infinity. In this case, however, in an angular region of each of the object points (for the projection optical system, a divergence angle of the semiconductor laser as the light source or an effective range of the transmitter lens; and for the receiving optical system, an effective range of the receiver lens), especially in the vicinity of the device, the object point is blurred, and a desired resolution may not be achieved.

There is a need for an optical measurement device which has higher angular resolution in the vicinity of the device.

SUMMARY OF THE INVENTION

According to an aspect of the present invention, there is provided an optical measurement device including a light source;

an optical element configured to condense a light beam emitted from the light source;

a light irradiator configured to irradiate the light beam onto an object; and a photo detector configured to detect reflected light being reflected by the object or scattered light being scattered by the object, wherein the reflected light or the scattered light is originated from the light beam which is irradiated onto the object, and the photo detector detects the reflected light or the scattered light through an imaging optical system wherein a first optical path length from the light source to a first conjugate image of the light source and a second optical path length from the photo detector to a second conjugate image of the photo detector are different from each other at least in a first direction, wherein the first conjugate image of the light source is formed by the optical element, and the second conjugate image of the photo detector is formed by the imaging optical system.

According to another aspect of the present invention, there is provided a vehicle which includes an optical measurement device, wherein the optical measurement device includes a first light source;

an optical element configured to condense a light beam emitted from the first light source;

a light irradiator configured to irradiate the light beam onto an object; and a photo detector configured to detect reflected light or scattered light of the light beam from the object through an imaging system, the light beam being irradiated onto the object, wherein a first optical path length from the first light source to a first conjugate image of the first light source by the optical element is different from a second optical path length from the photo detector to a second conjugate image of the photo detector by the imaging system at least in a first direction.

According to the disclosed technique, an optical measurement device can be provided which has higher angular resolution in the vicinity of the device.

Other objects, features and advantages of the present invention will become more apparent from the following detailed description when read in conjunction with the accompanying drawings.

DETAILED DESCRIPTION OF THE PREFERRED EMBODIMENTS

Figure 1A:
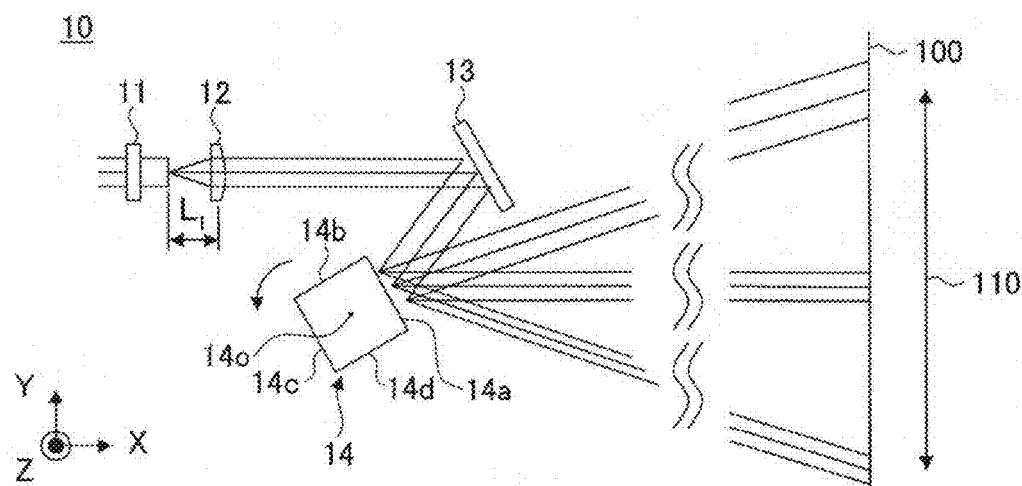
FIGS. 1A and 1B are schematic diagrams exemplifying a projection optical system of an optical measurement device according to an example.

Hereinafter, there is explained an embodiment of the present invention by referring to the accompanying drawings. In the drawings, corresponding elements may be denoted by the same reference numeral, and the overlapped explanation may be omitted.

In the present application, an optical measurement device includes, for example, a device that irradiates light to a predetermined region, and that determines presence or absence of an object in the predetermined region based on reflected light or scattered light. Further, in the present application, an optical measurement device includes, for example, a device that irradiates light to an object, and that measures a distance to the object based on reflected light or scattered light, when the presence of the object in a predetermined region is determined.

EXAMPLE

Figure 1B:
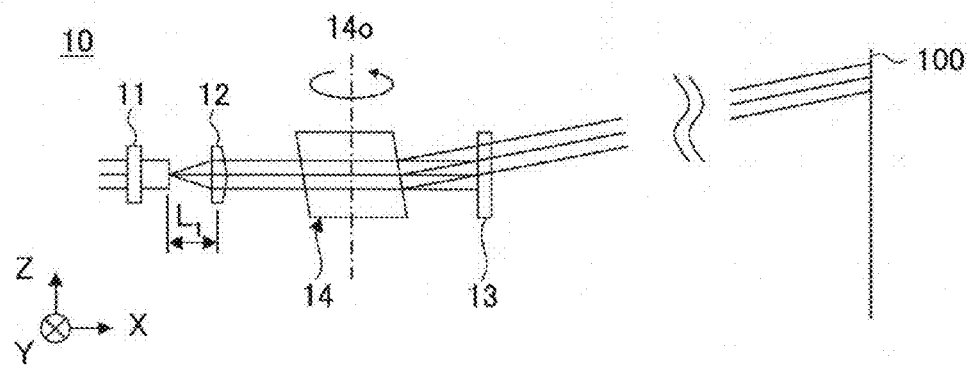
Figure 2A:
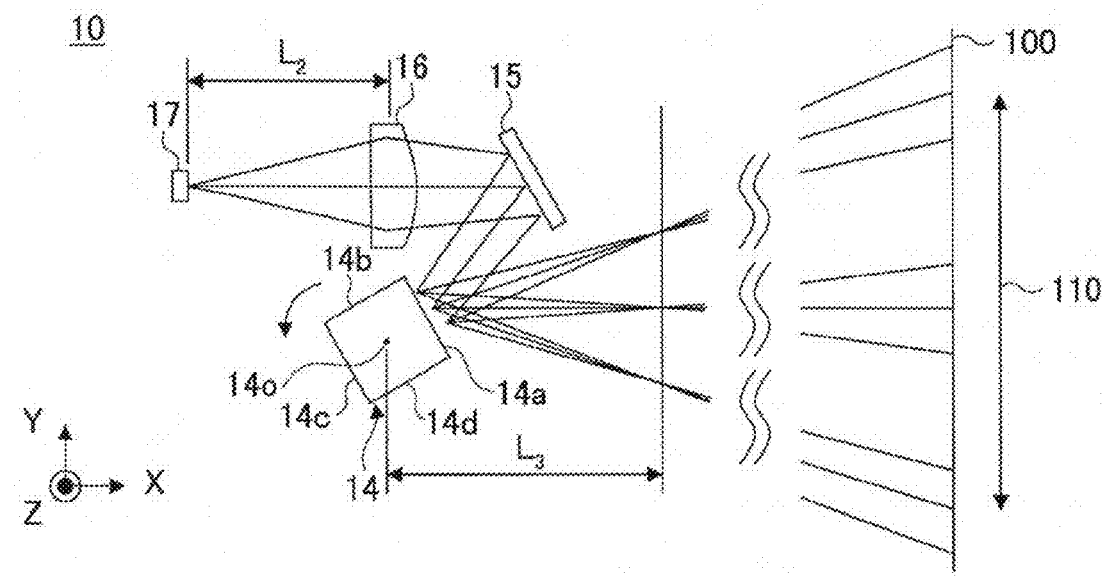
FIGS. 2A and 2B are schematic diagrams exemplifying a receiving optical system of the optical measurement device according to the example.
Figure 2B:
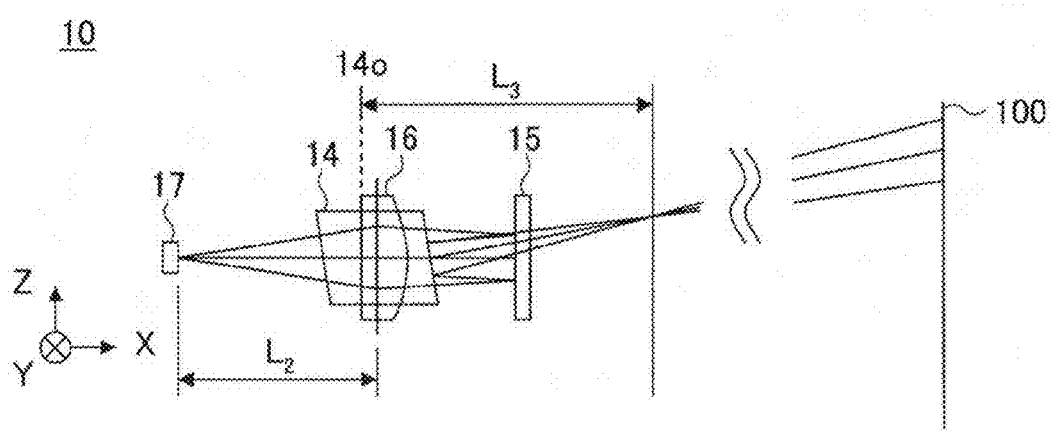

FIGS. 1A and 1B are schematic diagrams exemplifying a projection optical system of an optical measurement device according to an example. FIG. 1A shows a cross-section in a direction parallel to an XY-plane. FIG. 1B shows a cross-section in a direction parallel to an XZ-plane. FIGS. 2A and 2B are schematic diagrams exemplifying a receiving optical system of the optical measurement device according to the example. FIG. 2A shows a cross-section in a direction parallel to the XY-plane. FIG. 2B shows a cross-section in a direction parallel to the XZ-plane.

Referring to FIGS. 1A, 1B, 2A, and 2B, the optical measurement device 10 includes a light source 11; a coupling lens 12; a reflection mirror 13; a rotating mirror 14; a reflection mirror 15; an imaging lens 16; and a photo detector 17. Here, the reference numeral "100" indicates an image surface of an object, which is a detection target. The reference numeral "110" indicates a detection range.

In FIGS. 1A, 1B, 2A, and 2B, coordinate axes are defined such that an axis from the rotation mirror 14 to the center of the detection range 110 is defined to be an X-axis, an axis parallel to a direction in which the rotating mirror 14 scans a light beam is defined to be a Y-axis, and a direction of a rotation axis of the rotating mirror 14 is defined to be a Z-axis. The coordinate axes define a three-dimensional orthogonal coordinate system (the coordinate axes are defined in the same manner in the remaining figures). A direction in which the rotating mirror 14, which is a deflector, deflects and scans a light beam may be referred to as a "main scanning direction," and a direction which is perpendicular to the main scanning direction may be referred to as a "sub-scanning direction."

As for the light source 11, for example, a solid light source may be used, such as a semiconductor laser or a light-emitting diode. In this example, the semiconductor laser is used as the light source 11. An explanation is given by exemplifying a case in which the semiconductor laser is caused to perform pulse light emission.

The coupling lens 12 is disposed downstream of the light source 11. The coupling lens 12 may include a combination of a plurality of optical elements. The coupling lens 12 has a function to condense a light beam (diverging light) which is emitted from the light source 11. In this example, a focal length in the main scanning direction of the coupling lens 12 and a focal length in the sub-scanning direction of the coupling lens 12 are the same (which is denoted as a focal length $f_1$).

A distance between the light emitting part of the light source 11 and a first principal point of the coupling lens 12 is defined to be $L_1$. In this example, a point at which a principal plane of the coupling lens 12 and the optical axis cross at right angles is defined to be the first principal point.

The light source 11 and the coupling lens 12 are arranged such that the distance $L_1$ is equal to the focal length $f_1$ of the coupling lens 12 in the main scanning direction. Namely, the coupling lens 12 is arranged such that the first principal point is separated from the light emitting part of the light source 11 by a distance which is equal to the focal length $f_1$ (the light source 11 and the coupling lens 12 are arranged such that a conjugate image of the light source is formed at infinity). In this specification, "equal" means not only a case of strictly equal, but also a case of approximately equal to the extent that a predetermined effect of the present application is not lost.

Further, in the sub-scanning direction, the light source 11 and the coupling lens 12 are arranged, so that the distance $L_1$ between the light emitting part of the light source 11 and the first principal point of the coupling lens 12 is equal to the focal length $f_1$ of the coupling lens 12. Namely, the coupling lens 12 is arranged such that the first principal point is separated from the light emitting part of the light source 11 by the focal length $f_1$ (the light source 11 and the coupling lens 12 are arranged such that the conjugate image of the light source 11 is formed at infinity).

Namely, in this example, the coupling lens 12 is arranged so that the diverging light which is emitted from the light source 11 becomes substantially parallel light. Actually, due to an effect of a light emitting region of the light source 11 (the semiconductor laser), light which passes through the coupling lens 12 becomes the diverging light. Details of this point are described later.

The light which passes through the coupling lens 12 enters the reflection mirror 13, and thereby the optical path of the light is converted by the reflection mirror 13. Then the light enters the rotating mirror 14. An angular difference on the XY-plane between the light which enters the reflection mirror 13 and the light which is reflected by the reflection mirror 13 may be set to be approximately 60 degrees, for example. The rotating mirror 14 includes at least two reflectors (reflection surfaces). Each of the reflectors are obliquely arranged with respect to the rotation axis 14o. The reflectors are tilted with respect to the rotation axis 14o by corresponding different angles. The coupling lens 12 is a typical example of an optical element according to the embodiment of the present invention. The light source 11 and the coupling lens 12 are a typical example of a light irradiator according to the embodiment of the present invention. The rotating mirror 14 is a typical example of a deflector according to the embodiment of the present invention.

In this example, the rotating mirror 14 includes four reflectors 14a, 14b, 14c, and 14d. Tilt angles of the corresponding reflectors 14a, 14b, 14c, and 14d with respect to the rotation axis 14o are set to be different angles. With this configuration, a traveling direction of the light which is reflected by the rotating mirror 14 with respect to the XY-plane can be switched. A layer which is to be detected can be shifted in the Z-axis direction for each of the reflectors 14a, 14b, 14c, and 14d. Namely, for the reflectors 14a, 14b, 14c, and 14d, corresponding regions, which are different regions in the Z-axis direction, are scanned. For the case of this example, four layers can be detected.

The light which enters the rotating mirror 14 is deflected and scanned by the rotating reflectors 14a, 14b, 14c, and 14d, and the light irradiates the detection range 110 of the image surface 100. The reflected light or the scattered light from the detection range 110 of the image surface 100 enters the rotating mirror 14 again. Then, the reflected light or the scattered light is sequentially reflected by the reflector 14a, 14b, 14c, and 14d, and the reflected light or the scattered light is reflected by the reflection mirror 15 again. Then, the reflected light or the scattered light enters the imaging lens 16.

The imaging lens 16 has a function to cause the reflected light or the scattered light from the detection range 110 of the image surface 100 to form an image. In this example, a focal length in the main scanning direction of the imaging lens 16 and a focal length in the sub-scanning direction of the imaging lens 16 are the same (which is denoted as a focal length $f_2$). The imaging lens 16 is a typical example of an imaging optical system according to the embodiment of the present invention. Further, the imaging lens 16 is a typical example of a first imaging element according to the embodiment of the present invention.

The reflected light or the scattered light from the detection range 110 of the image surface 100 which passes through the imaging lens 16 enters the photo detector 17. The photo detector 17 has a function to detect the reflected light or the scatter light through the imaging lens 16. Here, the reflected light or the scattered light is originated from the light beam which is irradiated onto the detection range 110 of the image surface 100. For example, an avalanche photodiode (APD) or a pin photodiode (PD) may be used as the photo detector 17. Here, the receiving optical system may be formed of a lens and a photo detector, without using a rotating mirror.

A distance from a light receiving part of the photo detector 17 and a second principal point of the imaging lens 16 is defined to be $L_2$. In this example, a point at which a principal plane of the imaging lens 16 and the optical axis cross at right angles is defined to be the second principal point. The photo detector 17 and the imaging lens 16 are arranged such that, in the main scanning direction, the distance $L_2$ becomes greater than the focal length $f_2$ of the imaging lens 16. Namely, the imaging lens 16 is arranged such that the distance between the second principal point of the imaging lens 16 and the light receiving part of the photo detector 17 is greater than the focal length $f_2$.

Further, in the sub-scanning direction, the photo detector 17 and the imaging lens 16 are arranged such that a distance $L_2$ from the light receiving part of the photo detector 17 to the second principal point of the imaging lens 16 is greater than the focal length $f_2$ of the imaging lens 16. Namely, the imaging lens 16 is arranged such that the distance between the second principal point and the light receiving part of the photo detector 17 is greater than the focal length $f_2$.

Namely, in the example, the imaging lens 16 is arranged such that, if it is assumed that a light beam is emitted from the photo detector 17, the light beam converges at a predetermined position. Technical meaning of such arrangement of the imaging lens 16 and the photo detector 17 is described later. Incidentally, in FIG. 2, $L_3$ indicates a minimum detection distance, which is the closest detection distance to an object with which the optical measurement device 10 can detect the object.

Figure 3:
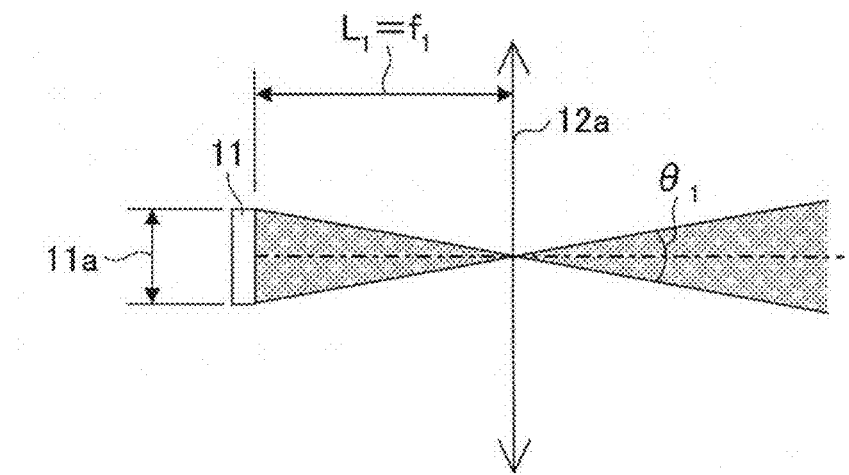
FIG. 3 is a diagram exemplifying an irradiated region of a light source, when a light emitting region of the light source is considered.

Here, it is described in detail that the light which passes through the coupling lens 12 becomes diverging light, due to the effect of the light emitting region of the light source 11 (the semiconductor laser). FIG. 3 is a diagram exemplifying an irradiated region of the light source 11, when the light emitting region of the light source is considered.

The distance between the light emitting part of the light source 11 to the first principal point of the coupling lens 12 is $L_1$. The first principal point is the point at which the principal plane 12a of the coupling lens 12 (which is denoted by the arrows in FIG. 3) and the optical axis of the coupling lens 12 cross at right angles. As described above, in this example, the light source 11 and the coupling lens 12 are arranged such that, in the main scanning direction and in the sub-scanning direction, the distance $L_1$ is equal to the focal length $f_1$ of the coupling lens 12.

As shown in FIG. 3, if a diameter of the light emitting region 11a of the light source is denoted by "a," a region in which an image of the light source 11 can be formed may be expressed by $\theta_1 = 2 \times \tan^{-1}(a/2f_1)$, provided that only the region close to the axis is considered. Namely, the angular range $\theta_1$ is the irradiated region by the light emitting region 11a of the light source 11. In this manner, when the light emitting region 11a of the light source 11 is considered, the light beam which passes through the coupling lens 12 diverges. In this example, an angular resolution of a region in which an object is detected is defined in terms of a beam divergence angle, which is shown in FIG. 3.

Here, the case is described in which the light beam from the light source 11 is converted into the parallel light by the coupling lens 12. For a case in which the light beam is converted into diverging light or converging light, it is necessary that the distance from the light emitting part of the light source 11 to the principal plane 12a of the coupling lens 12 is set to be different from the focal length $f_1$ of the coupling lens 12. In this case, $\theta_1$ can be expressed by a formula where the focal length $f_1$ of the coupling lens 12 is replaced by the distance $L_1$ from the light emitting part of the light source 11 to the first principal point, at which the principal plane 12a of the coupling lens 12 and the optical axis of the coupling lens 12 cross at right angles.

Figure 4A:
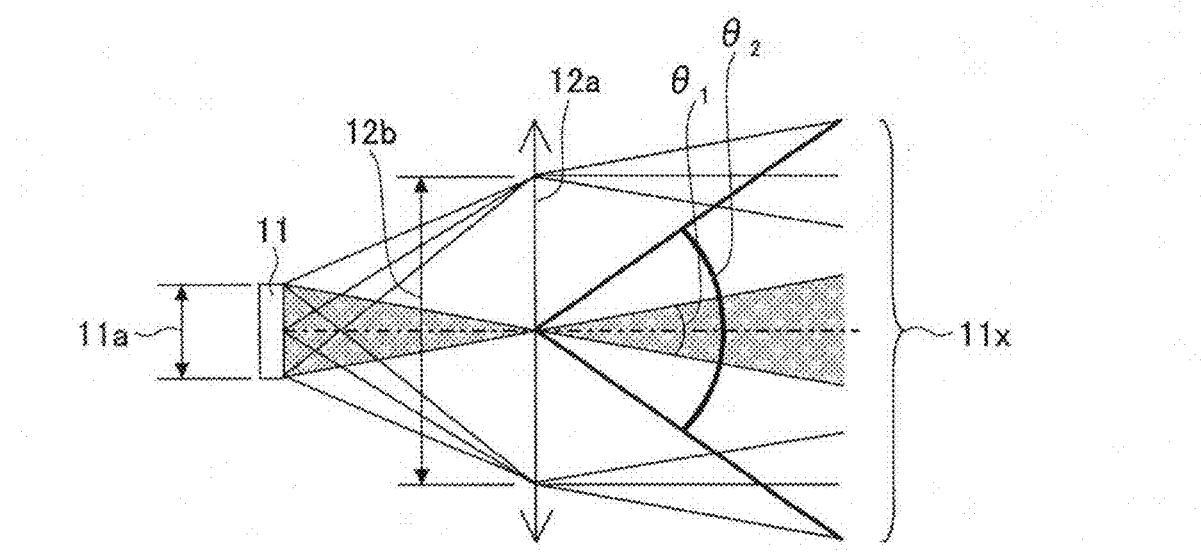
FIGS. 4A and 4B are diagrams exemplifying the irradiated region of the light source, when the light emitting region of the light source and an effective range of a coupling lens are considered.
Figure 4B:
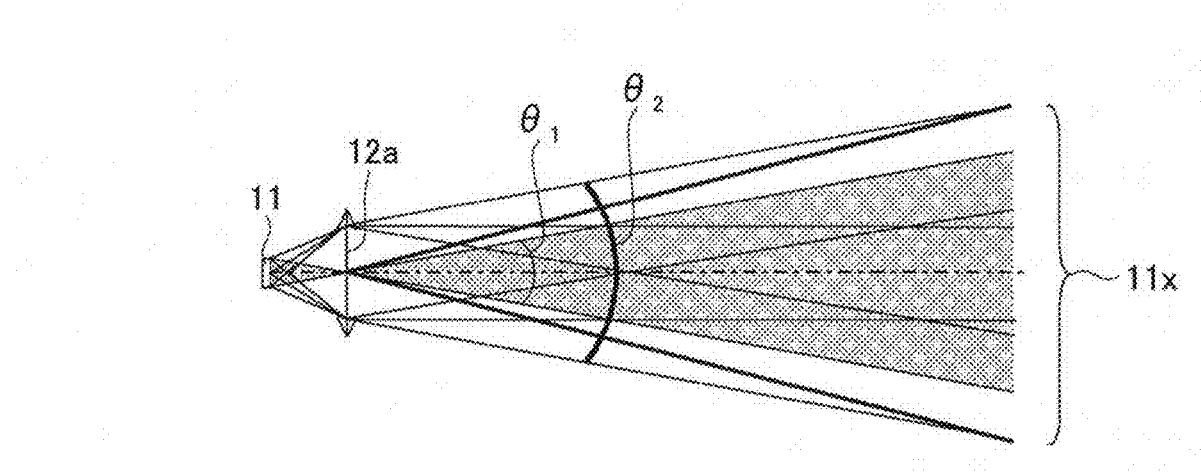

Next, a case is explained in which an effective range 12b of the coupling lens is considered. FIGS. 4A and 4B are diagrams exemplifying an irradiated region of the light source, when the light emitting region of the light source and the effective range of the coupling lens is considered. FIG. 4A shows the vicinity of the optical measurement device (the vicinity of the coupling lens 12). FIG. 4B shows a distant region of the optical measurement device (the distant region of the coupling lens 12).

When a light beam from the light source 11 enters the effective range 12b of the coupling lens 12 including an edge portion of the effective range 12b, an effect of off-axis light becomes large especially in the vicinity of the optical measurement device (the vicinity of the coupling lens 12), as shown in FIG. 4A. Accordingly, an imaging range 11x becomes wider than the irradiated region (which is indicated by the stain pattern in FIGS. 4A and 4B) by the light emitting region 11a of the light source 11, which is shown in FIG. 3. Namely, $\theta_2$ becomes greater than $\theta_1$, and the angular resolution is expanded (degraded) as indicated by the middle bold lines in FIGS. 4A and 4B.

As shown in FIG. 4B, the farther away the coupling lens 12 is, the more the irradiated region by the light emitting region 11a of the light source and the imaging range 11x are approximated. The irradiated region and the imaging range 11x coincide at infinity. Namely, the farther away the coupling lens 12 is, the more the values of $\theta_2$ and $\theta_1$ are approximated (the angular resolutions are approximated). At infinity, $\theta_2$ becomes equal to $\theta_1$, and the angular resolutions completely coincide.

As described above, in FIGS. 4A and 4B, the effective range 12b of the coupling lens 12 is considered. However, when the effective range 12b of the coupling lens 12 is sufficiently larger compared to the divergence angle of the light source 11, the off-axis light of the light source 11 is defined by the divergence angle. In this case, similarly, the angular resolution is degraded.

Figure 5:
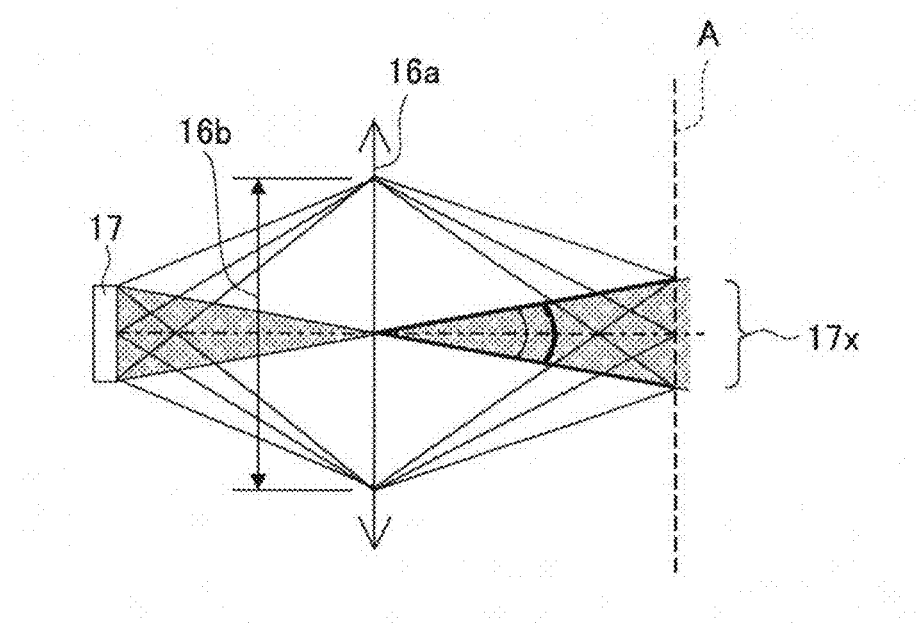
FIG. 5 is a schematic diagram exemplifying details of the receiving optical system of the optical measurement device according to the example.

FIG. 5 is a schematic diagram exemplifying the details of the receiving optical system of the optical measurement device according to the example. In FIG. 5, the reference numeral 16a indicates the principal plane of the imaging lens 16, the reference numeral 16b indicates an effective range of the imaging lens 16, the reference numeral 17x indicates an imaging range of the photo detector 17, and A indicates a focus surface. The focus surface is a surface including a predetermined point at which a light beam converges, if it is assumed that the light beam is emitted from the photo detector 17.

In the example, the angular resolution in the vicinity of the optical measurement device (in the vicinity of the imaging lens 16) is improved by the configuration of the receiving optical system such that, when the photo detector 17 is assumed to be an object point, an image of the photo detector 17 is formed by the imaging lens 16, as shown in FIG. 5.

The area in which an object can be detected is the area where an image of the light source 11 and an image of the photo detector 17 overlap. For example, even if an area is inside the image of the light source, namely, even if the area is inside the irradiated region by the light source 11, if the area is outside the image of the photo detector 17, the reflected light from that area is not guided to the photo detector 17.

Further, even if an area is inside the image of the photo detector 17, if the area is outside the image of the light source, the area is not irradiated by the light source 11, and the light is not reflected by the area. With the arrangement of the imaging lens 16 such that, when the photo detector 17 is assumed to be an object point, a conjugate image of the photo detector 17 is formed at infinity, the image of the photo detector 17 diverges in the vicinity of the optical measurement device (in the vicinity of the imaging lens 16), similar to the case of the projection optical system. Namely, with the arrangement such that, when it is assumed that a light beam is emitted from the photo detector 17, the light beam becomes parallel light, the image of the photo detector 17 diverges in the vicinity of the optical measurement device (in the vicinity of the imaging lens 16), similar to the case of the projection optical system.

However, as shown in FIG. 5, when a light beam is caused to form an image at a predetermined point (namely, when it is assumed that the light beam is emitted from the photo detector 17, the light beam is caused to converge at the predetermined point), an imaging range 17x of the photo detector 17 on the focus surface A coincides with a desired resolution. The distance $L_2$ from the light receiving part of the photo detector 17 to the second principal point of the imaging lens 16 is adjusted, so that the image of the photo detector 17 is formed in the vicinity of the optical measurement device (in the vicinity of the imaging lens 16). Then, even if the image of the light source 11 diverges, since the image of the photo detector 17 is narrowed down, the area in which the image of the light source 11 and the image of the photo detector 17 overlap can be reduced. Accordingly, the angular resolution can be made smaller, namely the angular resolution can be improved.

In this example, the angular resolution in the main scanning direction and the angular resolution in the sub-scanning direction are improved by making the configurations in both the main scanning direction (the Y-axis direction in FIGS. 1A, 1B, 2A, and 2B) and the sub-scanning direction (the Z-axis direction in FIGS. 1A, 1B, 2A, and 2B) to be the same as that of FIG. 5. However, only one of the configurations in the main scanning direction and in the sub-scanning direction may be made to be the same as that of FIG. 5.

Namely, the configuration may be such that, in at least one direction (a first direction) of the main scanning direction and the sub-scanning direction, the following first and second conditions are satisfied. The first condition is such that the first principal point of the coupling lens 12 is separated from the light source 11 by the distance which is equal to the focal length $f_1$ of the coupling lens 12. The second condition is such that the second principal point of the imaging lens 16 is separated from the photo detector 17 by the distance which is greater than the focal length $f_2$ of the imaging lens 16.

In this example, by the configuration such that the image of the photo detector 17 is formed at the minimum detection distance $L_3$ (by setting the position of the conjugate image of the photo detector 17 to be the position of the minimum detection distance $L_3$), the balance of the angular resolution can be maintained in the whole range of the detection distance. However, depending on the definition of the detection range, the position of the conjugate image of the photo detector 17 may be set to be a position which is different from the position of the minimum detection distance $L_3$.

In an optical measurement device according to related art, an optical path length from a light source to a conjugate image of the light source, which is formed by an optical element, and an optical path length from a photo detector to a conjugate image of the photo detector, which is formed by an imaging optical system, are the same in both the main scanning direction and in the sub-scanning direction. Namely, as described above, in the optical measurement device according to the related art, a light beam from the light source is converted into parallel light by the coupling lens, and the photo detector is disposed at the position of the focal length of the imaging optical system. In both the main scanning direction and in the sub-scanning direction, the distance between an object point (the light source or the photo detector) and a lens (the projection lens or the receiving lens) is set to be the focal length of the lens. That means the setting is made such that the conjugate image of the object point can be formed at infinity.

In other words, both an optical length from the light source to the conjugate image of the light source, which is formed by the optical element, and an optical length from the photo detector to the conjugate image of the photo detector, which is formed by the imaging optical system, are infinite.

Consequently, especially in the vicinity of the device, an image of the object point is blurred, and a desired angular resolution may not be achieved.

Whereas, in the optical measurement device 10, the optical distance from the light source to the conjugate image of the light source, which is formed by the optical element, and the optical length from the photo detector to the conjugate image of the photo detector, which is formed by the imaging optical system, are different in at least one direction of the main scanning direction and the sub-scanning direction.

More specifically, the first principal point of the coupling lens 12 is disposed at a position which is separated from the light source 11 by the distance which is equal to the focal length $f_1$ of the coupling lens 12. Accordingly (since the distance $L_1$ from the light emitting part of the light source 11 to the first principal point of the coupling lens 12 is equal to the focal length $f_1$ of the coupling lens 12), the optical path length from the light source 11 to the conjugate image of the light source 11, which is formed by the coupling lens 12, is infinite.

However, the second principal point of the imaging lens 16 is disposed at a position which is separated from the photo detector 17 by the distance which is greater than the focal length $f_1$ of the imaging lens 16. Namely, the imaging lens 16 and the photo detector 17 are arranged such that the distance $L_2$ from the light receiving part of the photo detector 17 to the second principal point of the imaging lens 16 is greater than the focal length $f_2$ of the imaging lens 16. Accordingly, the optical path length from the photo detector 17 to the conjugate image of the photo detector 17, which is formed by the imaging lens 16, is finite, and the image of the photo detector 17 is formed in the vicinity of the optical measurement device (in the vicinity of the imaging lens 16).

With such a configuration of the optical system, when the photo detector 17 is assumed to be an object point, the imaging lens 16 converts the light into converging light. Namely, the conjugate image of the photo detector 17 is formed at a position which is closer to the optical measurement device 10 than an infinitely distant position. Consequently, at the position where the conjugate image of the photo detector 17 is formed, the image of the photo detector 17 is not blurred. Further, since the region in which an object can be detected is determined by the region where the image of the light source 11 and the image of the photo detector 17 overlap, the angular resolution can be improved even at a position which is close to the optical measurement device 10. Namely, the angular resolution can be improved from a position which is close to the optical measurement device 10 to a position which is far from the optical measurement device 10. Here, the optical measurement device 10 can be applied to a laser radar for a vehicle, for example.

Modified Example

Figure 6A:
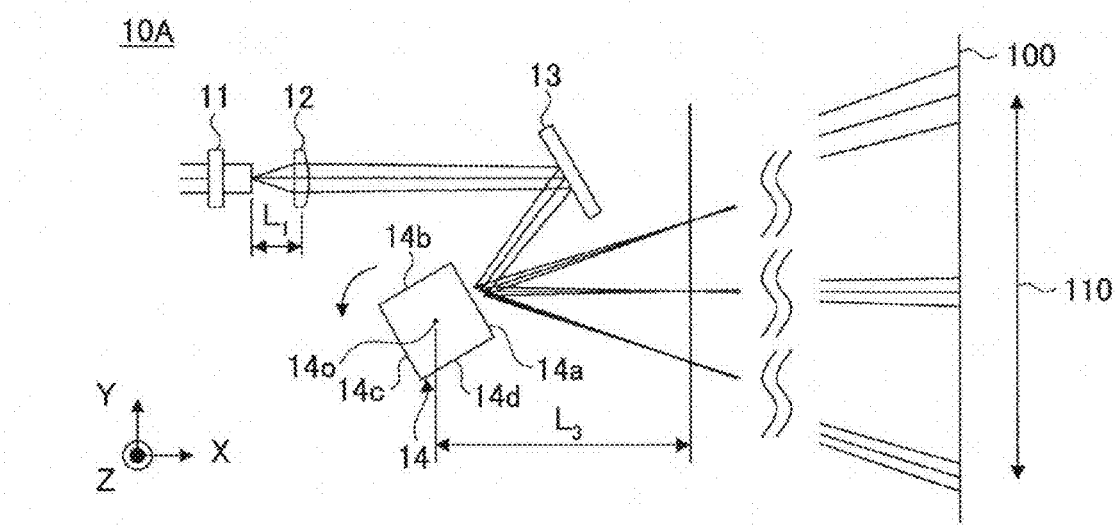
FIGS. 6A and 6B are schematic diagrams exemplifying the projection optical system of the optical measurement device according to a modified example.
Figure 6B:
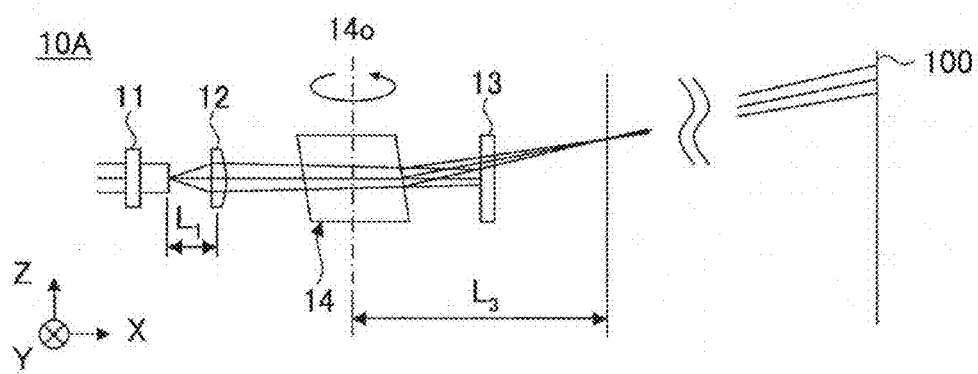
Figure 7A:
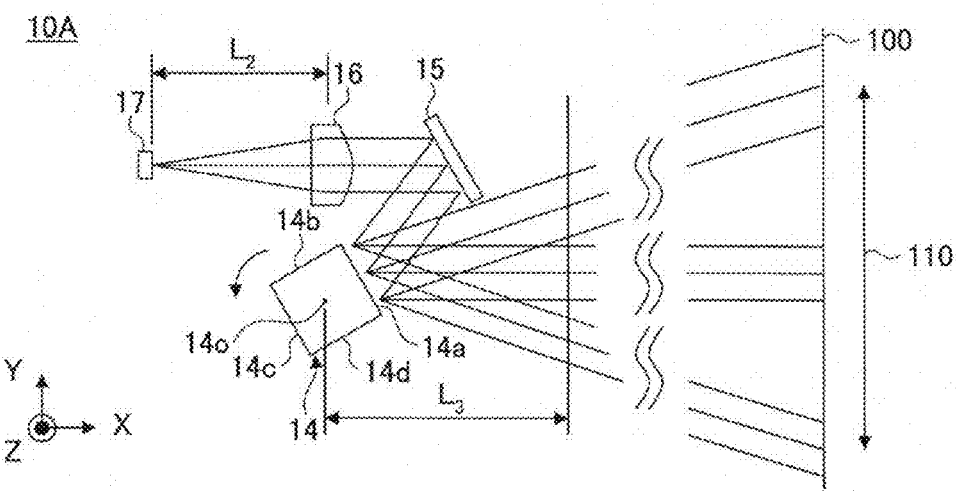
FIGS. 7A and 7B are schematic diagrams exemplifying the receiving optical system of the optical measurement device according to the modified example.
Figure 7B:
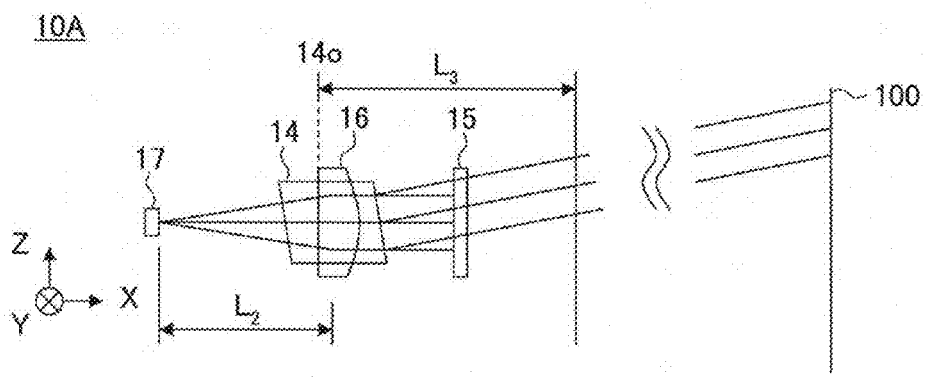

FIGS. 6A and 6B are schematic diagrams exemplifying the projection optical system of the optical measurement device according to a modified example. FIG. 6A shows a cross-section parallel to the XY-plane. FIG. 6B shows a cross-section parallel to the XZ-plane. FIGS. 7A and 7B are diagrams exemplifying the receiving optical system of the optical measurement device according to the modified example. FIG. 7A shows a cross-section parallel to the XY-plane. FIG. 7B shows a cross-section parallel to the XZ-plane.

In the above-described example, the light beam from the light source 11 is converted into the parallel light, namely, the conjugate image of the light source 11 is formed at infinity, and the conjugate image of the photo detector 17 is formed in the vicinity of the optical measurement device 10.

However, as shown in FIGS. 6A, 6B, 7A, and 7B, by setting the position of the conjugate image of the light source 11 in the vicinity of the optical measurement device 10A, and setting the position of the conjugate image of the photo detector 17 at infinity, the angular resolution in the vicinity of the optical measurement device 10A and the angular resolution in a distant region from the optical measurement device 10A can be simultaneously maintained to be good.

Namely, in the optical measurement device 10A according to the modified example, the first principal point of the coupling lens 12 is disposed at a position which is separated from the light source 11 by a distance which is greater than the focal length $f_1$ of the coupling lens 12. Further, the second principal point of the imaging lens 16 is disposed at a position which is separated from the photo detector 17 by a distance which is equal to the focal length $f_2$ of the imaging lens 16.

Namely, the light source 11 and the coupling lens 12 are arranged such that the distance $L_1$ from the light emitting part of the light source 11 to the first principal point of the coupling lens 12 is greater than the focal length $f_1$ of the coupling lens 12. Further, the imaging lens 16 and the photo detector 17 are arranged such that the distance $L_2$ from the light receiving part of the photo detector 17 to the second principal point of the imaging lens 16 is equal to the focal length $f_2$ of the imaging lens 16. With such a configuration, the angular resolution in the vicinity of the optical measurement device 10A and the angular resolution in a distant region from the optical measurement device 10A can be simultaneously maintained to be good.

However, as the above-described example, when the conjugate image of the light source is formed at infinity, and the conjugate image of the photo detector 17 is formed in the vicinity of the optical measurement device 10, the divergence of the light source 11 in a far distant region becomes smaller, and the light intensity density of a light beam which irradiates an object becomes large. Thus, the above-described example is preferable in a point that it is easier to secure quantity of light.

Another Example

An optical measurement device 20 having a plurality of light sources 11 and 21 is explained as another example. In this example, explanations of component parts which are the same as those of the above-described examples may be omitted.

Figure 8A:
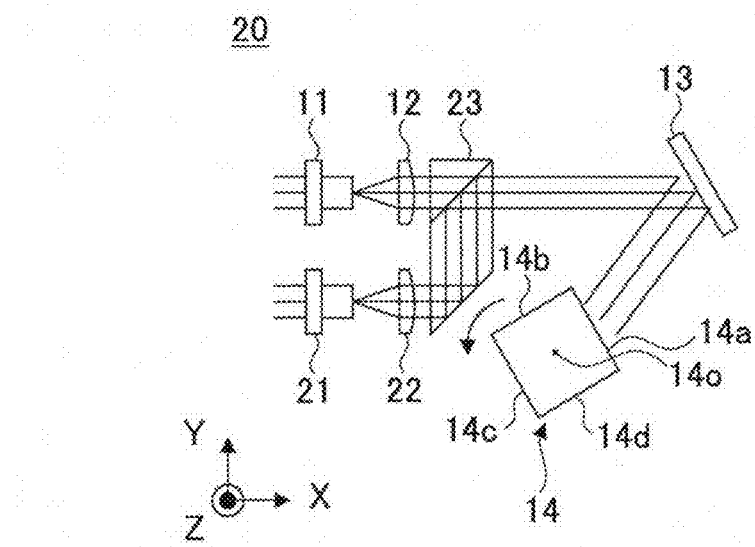
FIGS. 8A and 8B are schematic diagrams exemplifying the projection optical system of the optical measurement device according to another example.
Figure 8B:
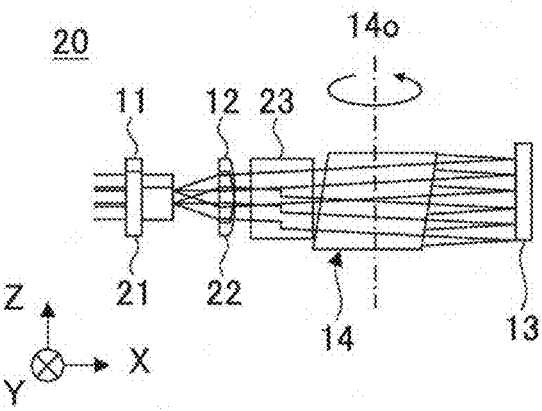

FIGS. 8A and 8B are schematic diagrams exemplifying the projection optical system of the optical measurement device 20 according to this example. FIG. 8A shows a cross-section parallel to the XY-plane. FIG. 8B shows a cross-section parallel to the XZ-plane. In FIGS. 8A and 8B, only an incident optical system up to the rotating mirror 14 is exemplified.

As shown in FIGS. 8A and 8B, the optical measurement system 20 according to this example is different from the optical measurement system 10 (cf. FIGS. 1A and 1B) according to the above-described example in a point that the optical measurement system 20 includes the plurality of light sources 11 and 21, and that an emission angle of the light source 11 and that of the light source 21 are different in the XZ-plane.

Namely, in the optical measurement device 20, when the light sources 11 and 21 are viewed from a direction perpendicular to the XZ-plane, the light sources 11 and 21 are disposed at corresponding different positions in the Z-axis direction. Further, when a coupling lens 12 and a coupling lens 22 are viewed from a direction perpendicular to the XZ-plane, the coupling lens 12 and the coupling lens 22 are disposed at corresponding different positions in the Z-axis direction. Diverging light which is emitted from the light source 11 passes through the coupling lens 12. Diverging light which is emitted from the light source 21 passes through the coupling lens 22.

A combining prism 23 combines the light, and the combined light enters a reflection mirror 13.

With this configuration, the light source 11 and the light source 21 scan corresponding regions of the detection range 110, which are different in the Z-axis direction. Thus, an object can be detected, while the detection range in the Z-axis direction is divided into two layers. Namely, the detection resolution in the Z-axis direction can be provided. By choosing suitable arrangement of the light sources 11 and 21 and the coupling lenses 12 and 22 in the Z-axis direction, the angular resolution of the irradiated region by the light sources 11 and 21, and the extent of the overlapping can be suitably adjusted.

Figure 9A:
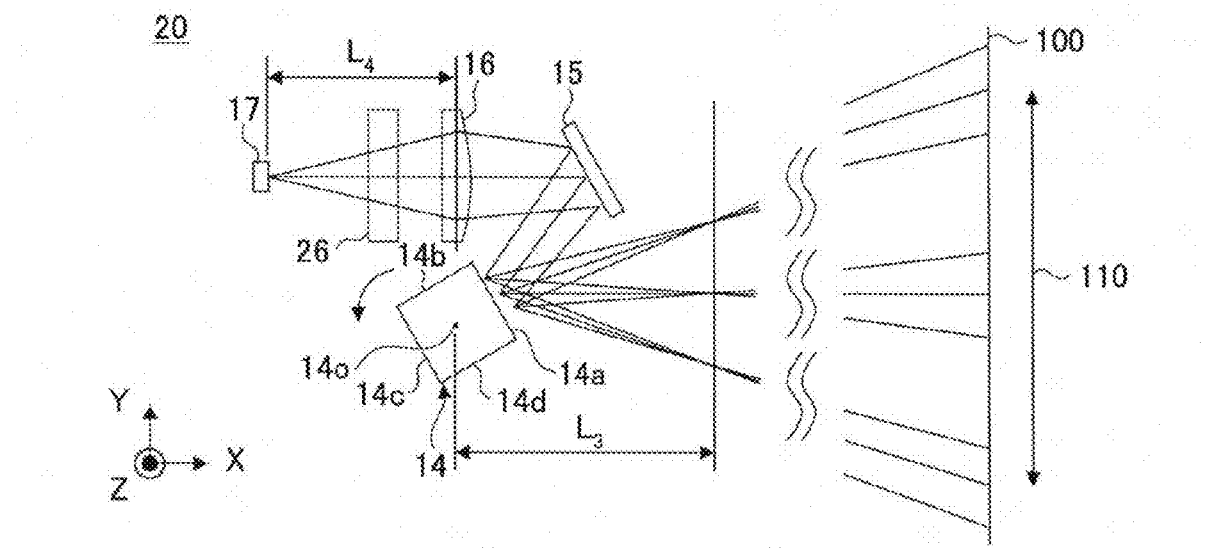
FIGS. 9A and 9B are schematic diagrams exemplifying the receiving optical system of the optical measurement device according to the other example.
Figure 9B:
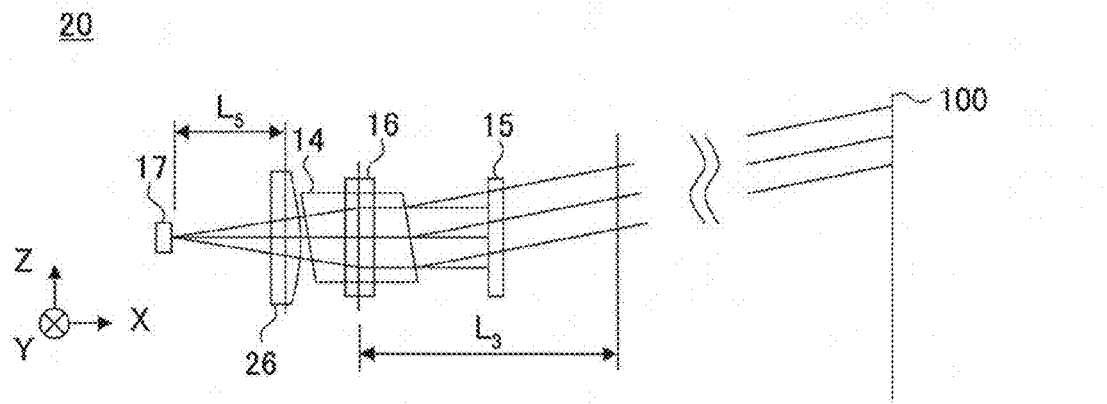

FIGS. 9A and 9B are schematic diagrams exemplifying the receiving optical system of the optical measurement device 20 according to this example. FIG. 9A shows a cross-section parallel to the XY-plane. FIG. 9B shows a cross-section parallel to the XZ-plane. In the example of FIGS. 9A and 9B, there are two imaging lenses 16 and 26. The imaging lens 26 is a typical example of a second imaging element of the embodiment of the present invention.

Here, a distance from the light receiving part of the photo detector 17 to the second principal point of the imaging lens 16 is denoted as $L_4$. In this example, the imaging lens 16 has optical power only in the main scanning direction. A point at which the principal plane of the imaging lens 16 and the optical axis cross at right angles is defined to be the second principal point. The photo detector 17 and the imaging lens 16 are arranged such that the distance $L_4$ is greater than the focal length $f_2$ of the imaging lens 16 in the main scanning direction.

Namely, the imaging lens 16 is arranged such that the second principal point is disposed at a position which is separated from the light receiving part of the photo detector 17 by a distance which is greater than the focal length $f_2$.

Further, a distance from the light receiving part of the photo detector 17 to a third principal point of the imaging lens 26 is denoted as $L_5$. The imaging lens 26 has optical power only in the sub-scanning direction. A point at which a principal plane of the imaging lens 26 and the optical axis cross at right angles is defined to be the third principal point. The imaging lens 26 and the photo detector 17 are arranged such that the distance $L_5$ is equal to a focal length $f_3$ of the imaging lens 26.

Namely, the imaging lens 26 is arranged such that the third principal point is disposed at a position which is separated from the light receiving part of the photo detector 17 by a distance which is equal to the focal length $f_3$. Here, the value of the focal length $f_2$ and the value of the focal length $f_3$ are set, so that they are different from each other.

With this configuration, arrangement can easily made such that a focal length in the main scanning direction of the receiving optical system is different from a focal length in the sub-scanning direction of the receiving optical system, and that a principal point in the main scanning direction of the receiving optical system is different from a principal point in the sub-scanning direction of the receiving optical system. Various modifications may be made, such as adoption of a configuration in which an entrance surface of a single imaging lens has optical power only in the main scanning direction, and an exit surface of the single imaging lens has optical power only in the sub-scanning direction, or adoption of an anamorphic surface whose optical power in the main scanning direction is different from that in the sub-scanning direction.

In this example, the principal point in the main scanning direction is disposed at the position which is separated from the photo detector 17 by the distance which is greater than the focal length in the main scanning direction, and the principal point in the sub-scanning direction is disposed at the position which is separated from the photo detector 17 by the distance which is equal to the focal length in the sub-scanning direction. This configuration is for maintaining a region in the sub-scanning direction of an image of the photo detector 17 to be wide, so that the detection ranges of the plurality of light sources can be covered, while improving the angular resolution in the main scanning direction in the vicinity of the optical measurement device.

In this manner, when the optical measurement device includes the plurality of light sources (it may includes three or more light sources), a detectable region can be enlarged, quantity of light can be ensured, and detection speed can be increased, for example. At this time, if the detection can be performed by a single photo detector 17 which has an approximately circular shape, the cost of the photo detector 17 can be reduced. Further, by choosing the focal length in the main scanning direction of the imaging lens and that in the sub-scanning direction depending on the angular resolution in the main scanning direction and in the sub-scanning direction, the size of the photo detector 17 can be freely adjusted.

Another Example

In the above-described examples, the scanning optical measurement devices are exemplified which include a deflector such as the rotating mirror 14. Here, a non-scanning type optical measurement device is exemplified which does not include a deflector such as the rotating mirror 14. In this example, explanations of component parts which are the same as those of the above-described examples may be omitted.

Figure 10:
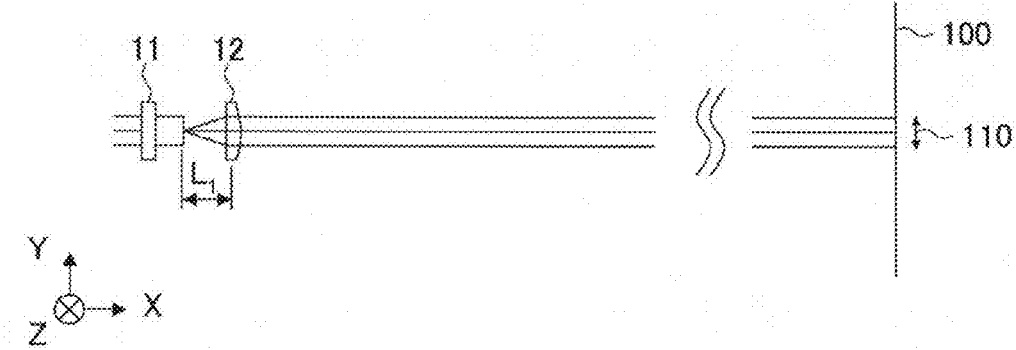
FIG. 10 is a schematic diagram exemplifying the projection optical system of the optical measurement device according to another example.

FIG. 10 is a schematic diagram exemplifying the projection optical system of the optical measurement device according to this example. FIG. 10 shows a cross-section parallel to the XY-plane.

Figure 11:
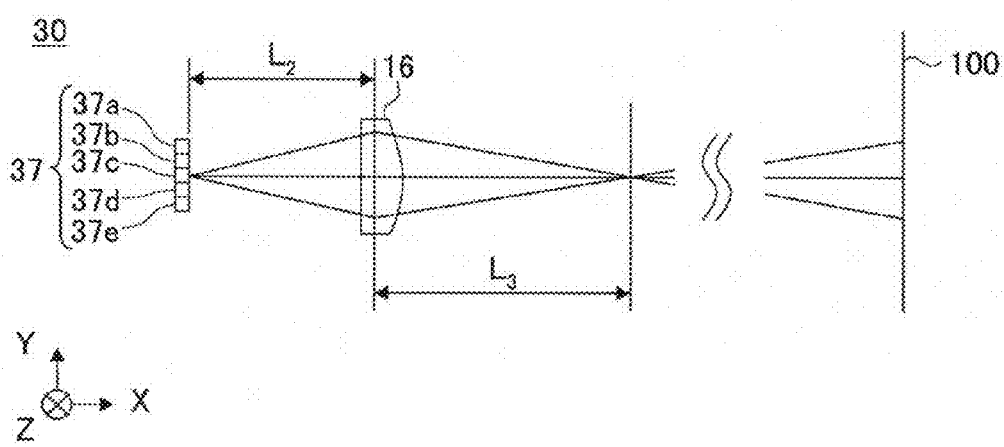
FIG. 11 is a schematic diagram exemplifying the receiving optical system of the optical measurement device according to the other example.

FIG. 11 is a schematic diagram exemplifying the receiving optical system of the optical measurement device according to this example. FIG. 11 shows a cross-section parallel to the XY-plane. Here, the projection optical system and the receiving optical system are rotation symmetric systems. Accordingly, the cross-sections parallel to the XZ-plane are the same as those of FIGS. 10 and 11.

As shown in FIGS. 10 and 11, the optical measurement device 30 is different from the optical device 10 (cf. FIGS. 1A, 1B, 2A, and 2B) according to the above-described example in a point that the optical measurement device 30 does not include the reflection mirrors 13 and 15, and the rotating mirror 14, and that the photo detector 17 is replaced by a photo detector 37.

A distance from the light emitting part of the light source 11 to the first principal point of the coupling lens 12 is denoted as $L_1$. A point at which the principal plane of the coupling lens 12 and the optical axis of the coupling lens 12 cross at right angles is defined to be the first principal point. In this example, the light source 11 and the coupling lens 12 are arranged such that the distance $L_1$ is equal to the focal length $f_1$ of the coupling lens 12. Namely, the coupling lens 12 is arranged such that the first principal point is disposed at a position which is separated from the light emitting part of the light source 11 by the distance which is equal to the focal length $f_1$ (the light source 11 and the coupling lens 12 are arranged, so that the conjugate image of the light source 11 is formed at infinity).

In this example, the coupling lens 12 is arranged, so that diverging light which is emitted from the light source 11 becomes substantially parallel light. In reality, however, by the effect of the light emitting region of the light source 11 (the semiconductor laser), the light which passes through the coupling lens 12 becomes diverging light.

The light which passes through the coupling lens 12 travels straight as it is, and the light irradiates the detection range 11 of the image surface 100. The reflected light or the scattered light from the detection range 11 of the image surface 100 enters the imaging lens 16, and the reflected light or the scattered light passes through the imaging lens 16 and enters the photo detector 37.

The photo detector 37 is, for example, a multi-channel photo detector, in which a plurality of photo detectors is arranged in line in the Y-axis direction. In this example, the photo detectors 37a, 37b, 37c, 37d, and 37e are arranged in line in the Y-axis direction. For each of the photo detectors 37a, 37b, 37c, 37d, and 37e, for example, an avalanche photodiode (APD) or a pin photodiode (PD) may be used.

In this example, the multi-channel photo detector 37 having the plurality of photo detectors is used, so that the non-scanning type optical measurement device 30 can detect the reflected light or the scattered light (which is referred to as the reflected light or the like, hereinafter), while dividing the detection range 110 of the image surface 100. In the scanning type optical measurement device 10 or the like, the optical system is such that the reflected light or the like of the light which sequentially scans the detection range 110 always returns to the detection surface of the photo detector 17. The photo detector 17 detects the reflected light or the like of the light which sequentially scans the detection range 110 by applying a time division method.

In the optical measurement device 30, scanning is not performed. Thus, the light which is emitted from the light source 11 and which passes through the coupling lens 12 irradiates the detection range 110 at once. The reflected light beams (or the scattered light beams) which are reflected at corresponding different regions in the Y-axis direction of the detection range 110 return to the corresponding different detection surfaces of the photo detectors 37a-37e. Namely, the photo detectors 37a-37e detect the reflected light beams (or the scattered light beams) from the corresponding different regions, which are formed by dividing the detection range 110 in the Y-axis direction.

Here, in the photo detector 37, the number of photo detectors which are arranged in line in the Y-axis direction is not limited to five. The number of the photo detectors may be more than five, or it may be less than five. When the detection range 110 is narrow, the photo detector 37 may not be the multi-channel photo detector. Similar to the case of the above-described example, the photo detector 37 may be a single-channel photo detector.

Further, photo detectors may also be arranged in the Z-axis direction, so that the photo detectors are arranged on the YZ-surface in the horizontal direction and in the vertical direction. It suffices if some photo detectors are arranged, so that all the reflected light or the like of the light which irradiates the detection range 110 at once can be detected by dividing the region. For example, the diameter of the coupling lens 12 may be enlarged, and the detection range 110 may be irradiated by the parallel light having the large diameter at once. The reflected light beams or the scattered light beams from the corresponding divided regions may be detected by a multi-channel photo detector having necessary number of photo detectors which form a photo detector array.

The distance from the light receiving parts of the corresponding photo detectors of the photo detector 37 to the second principal point of the imaging lens 16 is denoted by $L_2$. A point at which the principal plane of the imaging lens 16 and the optical axis of the imaging lens 16 cross at right angles is defined to be the second principal point.

The photo detector 37 and the imaging lens 16 are arranged such that the distance $L_2$ is greater than the focal length $f_2$ of the imaging lens 16. Namely, the imaging lens 16 is arranged such that the second principal point is separated from the light receiving part of the photo detector 37 by the distance which is greater than the focal length $f_2$.

In this example, the imaging lens 16 is arranged such that, when it is assumed that light beams are emitted from the corresponding photo detectors of the photo detector 37, the light beams converge at a predetermined point. In FIG. 11, $L_3$ indicates the minimum detection distance, which is the closest distance with which the optical detector 30 can detect an object.

Such a configuration of the optical system demonstrates the following effect, similar to the above-described example. Namely, when the photo detectors of the photo detector 37 are assumed to be the corresponding object points, the light beams are converted into converging light by the imaging lens 16. Namely, conjugate images of the photo detectors of the photo detector 37 are formed at a point which is closer to the optical measurement device than infinity. Consequently, at the point at which the conjugate images of the photo detectors of the photo detector 37 are formed, the images of the photo detectors of the photo detector 37 are not blurred. Further, since a region in which an object can be detected is determined by a region in which an image of the light source 11 and the images of the photo detectors of the photo detector 37 overlap, the angular resolution can be improved even at a point which is close to the optical measurement device 30. Namely, the angular resolution can be improved from a position which is close to the optical measurement device 30 to a position which is far from the optical measurement device 30.

The optical measurement device 30 may be adopted as a laser radar for a vehicle, for example. When the optical measurement device 30 is adopted as a laser radar for a vehicle, since the optical measurement device 30 does not includes a movable component such as the rotating mirror 14, high reliability can be achieved, compared to the optical measurement device 10 or the like, which includes a movable component such as the rotating mirror 14.

Modified Example

Here, a non-scanning type optical measurement device is exemplified, which is different from that of the above-described example. In this modified example, explanations of component parts which are the same as those of the above-described examples may be omitted.

Figure 12:
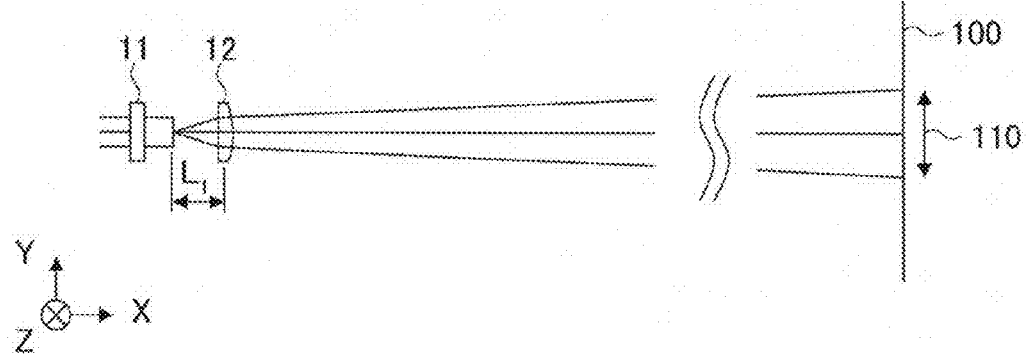
FIG. 12 is a schematic diagram exemplifying the projection optical system of the optical measurement device according to the other example.
Figure 13:
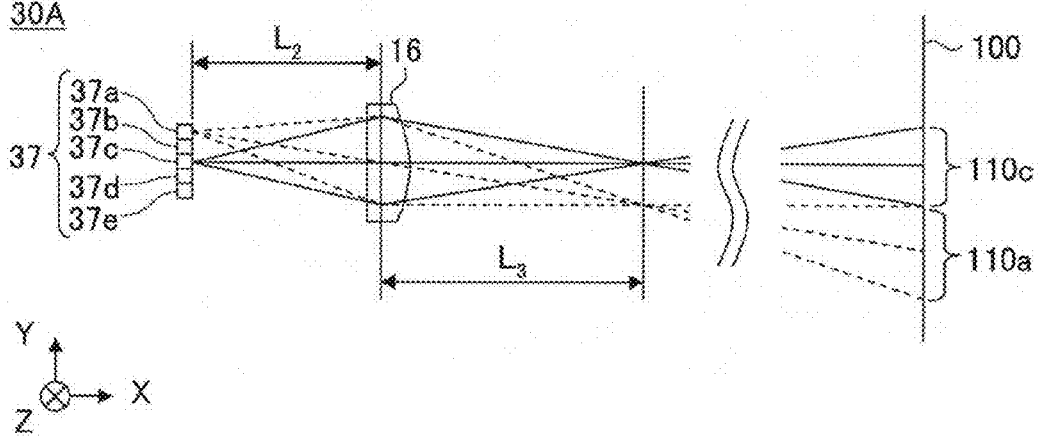
FIG. 13 is a schematic diagram exemplifying the receiving optical system of the optical measurement device according to the other example.

FIG. 12 is a schematic diagram exemplifying the projection optical system of the optical measurement device according to this modified example. FIG. 12 shows a cross-section parallel to the XY-plane. FIG. 13 is a schematic diagram exemplifying the receiving optical system of the optical measurement device according to this modified example. FIG. 13 shows a cross-section parallel to the XY-plane. Here, the projection optical system and the receiving optical system are rotationally symmetric systems. Accordingly, the cross-sections parallel to the XZ-plane are the same as those of FIGS. 12 and 13.

In the optical measurement device 30 (cf. FIGS. 10 and 11) according to the above-described example, the light beam from the light source 11 is converted into the parallel light, namely, the conjugate image of the light source 11 is formed at infinity. In the optical measurement device 30A according to this modified example, the first principal point of the coupling lens 12 is disposed at a position which is separated from the light source 11 by a distance which is less than the focal length $f_1$ of the coupling lens 12.

Namely, the light source 11 and the coupling lens 12 are arranged such that the distance $L_1$ from the light emitting part of the light source 11 to the first principal point of the coupling lens 12 is less than the focal length $f_1$ of the coupling lens 12. Here, the receiving optical system is the same as that of the optical measurement device 30 according to the above-described example.

By such a configuration of the optical system, the light which is emitted from the light source 11 and which passes through the coupling lens 12 is converted into diverging light, and the diverging light irradiates the detection range 110 at once. By converting the light which passes through the coupling lens 12 into the diverging light, the detection range 110 which is irradiated at once can be enlarged.

Since the photo detectors 37a-37e detects reflected light beams or the like from corresponding different regions, which are formed by dividing the detection range 110 in the Y-axis direction, there is no problem if the detection range 110 which is irradiated at once is enlarged. Namely, as shown in FIG. 13, the reflected light or the like from the region 110a, which is formed by dividing the detection range 110 in the Y-axis direction, passes through the optical path indicated by the dashed lines, and the reflected light or the like is detected by the photo detector 37a. Further, the reflected light or the like form the region 110c, which is formed by dividing the detection range 110 in the Y-axis direction, passes through the optical path indicated by the solid lines, and the reflected light or the like is detected by the photo detector 37c.

Similarly, the reflected light beams or the like from other regions (not shown), which are formed by dividing the detection range 110 in the Y-axis direction, are detected by the corresponding optical detectors 37b, 37d, and 37e. At this time, there is no problem if the regions, which are detected by the neighboring photo detectors, are partially overlapped.

In this example, since the detection range 110, which is irradiated at once, is enlarged, the number of the photo detectors which are arranged in line in the Y-axis direction may be increased depending on necessity.

A region in which an object can be detected is determined by a region in which an image of the light source 11 and an image of one photo detector included in the photo detector 37 overlap. Thus, even if the detection range 110 which is irradiated at once is enlarged, it suffices if the distance $L_2$ from the light receiving parts of the photo detectors of the photo detector 37 to the second principal point of the imaging lens 16 is greater than the focal length $f_2$ of the imaging lens 16. In this manner, the angular resolution can be improved from a position which is close to the optical measurement device 30A to a position which is far from the optical measurement device 30A, similar to the case of the above-described example.

Another Modified Example

The optical measurement device 30 may be modified, similar to the case of the optical measurement device 10. Namely, by forming the conjugate image of the light source 11 in the vicinity of the optical measurement device, and by forming the conjugate image of the photo detector 37 at infinity, the angular resolution in the vicinity of the optical measurement device and in the distant region of the optical measurement device can be simultaneously maintained to be good.

Specifically, in FIG. 10, the first principal point of the coupling lens 12 is disposed at a position which is separated from the light source 11 by a distance which is greater than the focal length $f_1$ of the coupling lens 12. Additionally, in FIG. 11, the second principal point of the imaging lens 16 is disposed at a position which is separated from the photo detector 37 by a distance which is equal to the focal length $f_2$ of the imaging lens 16.

Namely, the light source 11 and the coupling lens 12 are arranged such that the distance $L_1$ from the light emitting part of the light source 11 to the first principal point of the coupling lens 12 is greater than the focal length $f_1$ of the coupling lens 12. Further, the imaging lens 16 and the photo detector 37 are arranged such that the distance $L_2$ from the light receiving parts of the photo detectors of the photo detector 37 to the second principal point of the imaging lens 16 is equal to the focal length $f_2$ of the imaging lens. With this configuration, the angular resolution in the vicinity of the optical measurement device and in the distant region of the optical measurement device can be simultaneously maintained to be good, similar to the case of the optical measurement device 10. However, the detection range 110 becomes smaller than that of the optical measurement device 30.

Further, the optical measurement device 30 may be modified similar to the optical measurement device 20. Namely, similar to the case of FIGS. 8A and 8B, the optical measurement device 30 may include a plurality of light sources (the light sources 11 and 21), and the light source 11 and the light source 21 may be arranged so that an angle of the light emitted from the light source 11 is different from an angle of the light emitted from the light source 21 in the XZ-plane (the light source 11 and the light source 21 are disposed at different positions when they are viewed from a direction which is perpendicular to the XZ-plane).

However, since the rotating mirror 14 and the reflection mirror 13 are unnecessary, the diverging light which is emitted from the light source 11 and the diverging light which is emitted from the light source 21 are combined by the combining prism 23 through the coupling lens 12 and the coupling lens 22, respectively, and the combined light travels straight as it is, and the combined light irradiates the detection range 110 of the image surface 100. With this configuration, the detection range in the Z-axis direction can be enlarged. Further, in the photo detector 37, the photo detectors may also be arranged in the Z-axis direction, so that the photo detectors are arranged in the vertical direction and in the horizontal direction on the YZ-plane.

Further, the imaging lens may be a single lens (only the imaging lens 16). Alternatively, similar to the case of FIGS. 9A and 9B, the imaging lens may include two lenses (the imaging lenses 16 and 26).

For example, the imaging lens 16 may be a lens which has optical power only in the Y-axis direction (the horizontal direction). The second principal point is defined to be a point at which the principal plane of the imaging lens 16 and the optical axis of the imaging lens 16 cross at right angles. The photo detector 37 and the imaging lens 16 are arranged such that, in the Y-axis direction (the horizontal direction), the distance $L_4$ is greater than the focal length $f_2$ of the imaging lens. Namely, the imaging lens 16 is arranged such that the second principal point is disposed at a position which is separated from the light receiving part of the photo detector 37 by the distance which is greater than the focal length $f_2$.

Further, the imaging lens 26 may be a lens which has optical power only in the Z-axis direction (the vertical direction). The third principal point is defined to be a point at which the principal plane of the imaging lens 26 and the optical axis of the imaging lens 26 cross at right angles. The imaging lens 26 and the photo detector 37 are arranged such that, in the Z-axis direction (the vertical direction), the distance $L_5$ is equal to the focal length $f_3$ of the imaging lens 26. Namely, the imaging lens 26 is arranged such that the third principal point is disposed at a position which is separated from the light receiving parts of the photo detectors of the photo detector 37 by the distance which is equal to the focal length $f_3$. Here, the values of the focal length $f_2$ and the focal length $f_3$ are set to be different values.

With such a configuration, arrangement can easily made such that a focal length in the Y-axis direction (the horizontal direction) of the receiving optical system is different from a focal length in the Z-axis direction (the vertical direction) of the receiving optical system, and that a principal point in the Y-axis direction (the horizontal direction) of the receiving optical system is different from a principal point in the Z-axis direction (the vertical direction) of the receiving optical system. Various modifications may be made, such as adoption of a configuration in which an entrance surface of a single imaging lens has optical power only in the Y-axis direction (the horizontal direction), and an exit surface of the single imaging lens has optical power only in the Z-axis direction (the vertical direction), or adoption of an anamorphic surface whose optical power in the Y-axis direction (the horizontal direction) is different from that in the Z-axis direction (the vertical direction).

For example, the principal point in the Y-axis direction (the horizontal direction) is disposed at a position which is separated from the photo detector 37 by a distance which is greater than the focal length in the Y-axis direction (the horizontal direction), and the principal point in the Z-axis direction (the vertical direction) is disposed at a position which is separated from the photo detector 37 by a distance which is equal to the focal length in the Z-axis direction (the vertical direction). With this configuration, the angular resolution in the vicinity of the optical measurement device can be improved in the Y-axis direction (the horizontal direction), while a region in the Z-axis direction (the vertical direction) of an image of the photo detector 37 is maintained to be wide, so that the detection ranges of the plurality of light sources can be covered.

In this manner, for the case of the non-scanning type optical measurement device, similar to the case of the scanning optical measurement device, when the optical measurement device includes the plurality of light sources (it may includes three or more light sources), a detectable region can be enlarged, quantity of light can be ensured, and the detection speed can be increased. Further, by choosing the focal length in the Y-axis direction (the horizontal direction) of the imaging lens and the focal length in the Z-axis direction (the vertical direction) of the imaging lens depending on the angular resolution in the Y-axis direction (the horizontal direction) and in the Z-axis direction (the vertical direction), the size of the photo detector 37 can be freely adjusted.

Another Example

Here, an example is explained in which the optical measurement device 30 is adopted as a laser radar for a vehicle. In this example, explanations of component parts which are the same as those of the above-described examples may be omitted.

Figure 14:
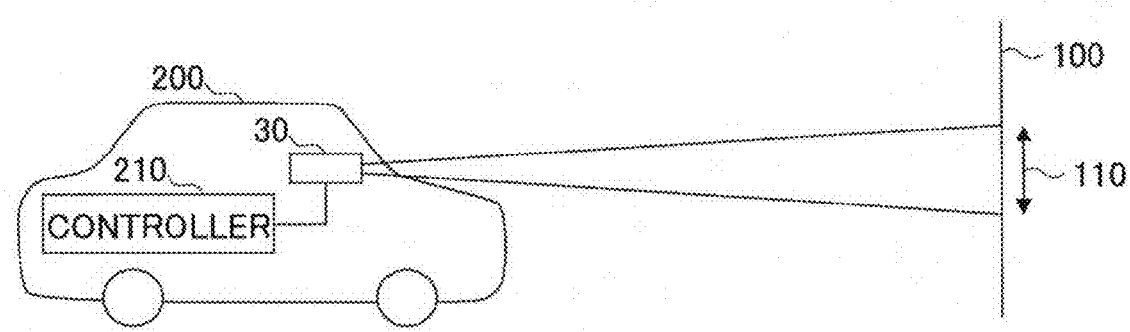
FIG. 14 is a diagram schematically showing a situation in which the optical measurement device according to the other example is mounted on a vehicle.

FIG. 14 is a diagram schematically shows a state in which the optical measurement device 30 is mounted on a vehicle. Referring to FIG. 14, the optical measurement device 30 is mounted on the vehicle 200. The optical measurement device 30 is a so-called "laser radar."

The optical measurement device 30 has a configuration such that the optical measurement device 30 can transmit signals to and receive signal from a controller 210, which is mounted on the vehicle 200. The controller 210 includes a CPU, a ROM, and a main memory, for example. Each of functions of the controller 210 can be achieved when a corresponding program which is stored in the ROM or the like is read out into the main memory, and the corresponding program is executed by the CPU. A portion of the controller 210 or the whole controller 210 may be achieved only by hardware. Further, the controller 210 may physically formed of a plurality of devices.

In response to a command from the controller 210, the light source 11 of the optical measurement device 30 emits light, and the light irradiates outside the vehicle (for example, in front of the vehicle 200 through the windshield of the vehicle 200). If an object exists in front of the vehicle 200, which is the detection target such as another vehicle or an obstacle, the detection range 110 of the image surface 100 of the object is irradiated, and the reflected light or the scattered light from the detection range 110 is detected by the photo detector 37 of the optical measurement device 30 through the windshield of the vehicle 200, for example.

The optical signal detected by the photo detector 37 is, for example, photoelectrically converted and transmitted to the controller 210. The controller 210 applies predetermined signal processing to the signal, which is transmitted from the photo detector 37. In this manner, the controller 210 can determine whether an object exists outside the vehicle 200 (for example, in front of the vehicle 200). Further, when the object exists, the controller 210 can calculate a distance to the object and relative speed of the object.

As described above, the optical measurement device 30 can be adopted as a laser radar for a vehicle. Since the angular resolution of the optical measurement device 30 is good from a position which is close to the vehicle 200 to a position which is far from the vehicle 200, the optical measurement device 30 can detect an object with a high precision. Thus, the optical measurement device 30 can stably obtain information about the object (e.g., presence or absence of the object, a distance to the object, or relative speed of the object). When the optical measurement device 10, 10A, 20, or 30A is mounted on the vehicle 200, instead of the optical measurement device 30, an object can be detected with a high precision, and the information about the object can be stably obtained.

Here, it is not required that the optical measurement device 30 emits light in front of the vehicle 200. For example, the optical measurement device 30 may emit light backward or laterally, and thereby the optical measurement device 30 may obtain information about an object in the backward direction or in the side direction. The information can be used to avoid collision. Further, the vehicle is not limited to the automobile, and it may include a motor cycle or a train, for example.

The present invention is not limited to the specifically disclosed embodiment, and variations and modifications may be made without departing from the scope of the present invention.

For example, in the first and second examples and their modifications, the first and second conditions described below may be satisfied at least in one direction of the main scanning direction and the sub-scanning direction. The first condition is to arrange the light source 11 and the coupling lens 12 such that the distance $L_1$ from the light emitting part of the light source 11 to the first principal point of the coupling lens 12 is greater than the focal length $f_1$ of the coupling lens 12. The second condition is to arrange the photo detector 17 and the imaging lens 16 such that the distance $L_2$ from the light receiving part of the photo detector 17 to the second principal point of the imaging lens 16 is greater than the focal length $f_2$ of the imaging lens 16. In this case, an effect is demonstrated, which is similar to those of the examples.

Further, the above-described examples and their modified examples may be suitably combined. For example, for a case where there is only one light source, the focal length of the imaging lens may have different values depending on a direction.

Further, the last example merely shows one example of the way of the usage of the optical measurement device. Namely, the usage of the optical measurement device according to the above-described examples or the modified examples is not limited to automotive usage. The optical measurement device may also be used as a device for detecting presence or absence of an object and for calculating a distance between the optical measurement device and the object, which is used for factory automation (FA), or for security, for example.

The present application is based on and claims the benefit of priority of Japanese Priority Applications No. 2012-174182 filed on Aug. 6, 2012, and No. 2013-138306 filed on Jul. 1, 2013, the entire contents of which are hereby incorporated herein by reference.

What is claimed is:

1. An optical measurement device comprising:
   a first light source;
   an optical element configured to condense a light beam emitted from the first light source and irradiate the light beam onto an object; and
   a photo detector configured to detect reflected light or scattered light of the light beam from the object, the reflected light or scattered light passing through an imaging system, the light beam being irradiated onto the object,
   wherein, at least in a first scanning direction, a first optical path length from the first light source to a first conjugate image of the first light source through the optical element is different from a second optical path length from the photo detector to a second conjugate image of the photo detector through the imaging system and,
   wherein the optical path at a light source side and a photo detector side includes a light converging point having a different position relative to the first light source and the photo detector.

2. The optical measurement device according to claim 1, further comprising:
   a deflector configured to deflect and scan the light been which passes through the optical element, wherein the deflector is disposed downstream of the optical element,
   wherein, a direction in which the deflector deflects and scans is a main scanning direction, and a direction which is perpendicular to the main scanning direction is a sub-scanning direction, the first direction being one of either the main scanning direction or the sub-scanning direction.

3. The optical measurement device according to claim 1, wherein the optical element has a first principal point and a first focal length at least in the first direction, wherein the first principal point is disposed at a first position which is separated from the first light source by the first focal length, and
   wherein the imaging system includes a first imaging element which has a second principal point and a second focal length at least in the first direction, wherein the second principal point is disposed at a second position which is separated from the photo detector by the second focal length.

4. The optical measurement device according to claim 3, wherein the first light source includes a plurality of second light sources, and second light beams from the corresponding second light sources irradiate different regions of the object,
   wherein the imaging system includes a second imaging element which has a third principal point and a third focal length in a second direction, the second direction being different from the first direction, and
   wherein the second focal length is different from the third focal length.

5. The optical measurement device according to claim 4, wherein the first imaging element is adjusted such that the second principal point is disposed at a third position which is separated from the photo detector by a distance which is greater than the second focal length, and
   wherein the third principal point is disposed at a fourth position which is separated from the photo detector by the third focal length.

6. The optical measurement device according to claim 1, wherein, when a closest detection distance of the optical measurement device is a minimum detection distance, a fifth position is a point which is separated from the optical measurement device by the minimum detection distance.

7. The optical measurement device according to claim 2, wherein a focal length in the main scanning direction is different from a focal length in the sub-scanning direction.

8. The optical measurement device according to claim 2, wherein
   the deflector is a rotating mirror including four reflectors, and
   wherein a traveling direction of the light beam or the reflected or scattered light of the light beam reflected by the rotating mirror with respect to an XY plan is switched to an opposite direction.

* * * * *